United States Patent
Grogan et al.

(10) Patent No.: US 11,431,842 B1
(45) Date of Patent: Aug. 30, 2022

(54) TECHNIQUES FOR MANAGING AN AGING TELEPHONE NUMBER BEFORE RETURNING TO ACTIVE SERVICE

(71) Applicant: Bandwidth, Inc., Raleigh, NC (US)

(72) Inventors: Annalyce Grogan, Raleigh, NC (US); Robert Brezina, Middlesex, NC (US); Lisa Jill Freeman, Durham, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/582,259

(22) Filed: Jan. 24, 2022

(51) Int. Cl.
*H04M 3/42* (2006.01)
*H04M 3/22* (2006.01)
*H04Q 3/00* (2006.01)
*H04L 101/65* (2022.01)

(52) U.S. Cl.
CPC ....... *H04M 3/42297* (2013.01); *H04M 3/229* (2013.01); *H04Q 3/0029* (2013.01); *H04L 2101/65* (2022.05)

(58) Field of Classification Search
None
See application file for complete search history.

(56) References Cited

U.S. PATENT DOCUMENTS

| | | | |
|---|---|---|---|
| 2012/0207285 A1* | 8/2012 | Lawson | H04M 3/30 379/32.04 |
| 2016/0072953 A1* | 3/2016 | Abushik | H04M 3/42144 379/211.02 |
| 2020/0213271 A1* | 7/2020 | Alekseenko | H04L 61/2053 |

* cited by examiner

*Primary Examiner* — Antim G Shah
(74) *Attorney, Agent, or Firm* — Gregory Stephens

(57) ABSTRACT

Techniques are described for managing out of service telephone numbers (TNs) before returning them to active service. A telephone number profile score may be calculated for an out of service TN entering an aging protocol, the aging protocol comprising a pre-determined number of days the TN must remain out of service. The out of service TN may then be assigned a profile based on its telephone number profile score, the profile indicative of how quickly the TN will achieve one or more quality thresholds. The number of days from entry into the aging protocol it will take the TN to achieve the one or more quality thresholds based on its assigned profile may be determined. The quality threshold status of the TN may then be updated each time it crosses one of the quality thresholds. Once it completes the aging process, the TN may be placed into an inventory of TNs eligible for active service. Thereafter, the quality threshold status of the TN may continue to be updated each time it crosses one of the quality thresholds.

21 Claims, 8 Drawing Sheets

| Parameter | Scaling/Scoring Criteria |
|---|---|
| 705<br><br>Avg. Daily Calls (ADC) received within 90 days of disconnection | 710<br>ADC = 0    scaled score = 100<br>ADC = 1    scaled score = 99<br>ADC = 2    scaled score = 98<br>ADC = 3    scaled score = 97<br>ADC = 4    scaled score = 96<br>ADC = 5    scaled score = 95<br>ADC = 99  scaled score = 1<br>ADC = 100 scaled score = 0 |
| 715<br><br>Prior TN Use Case | 720<br>Messaging Only    --> scaled score = 95<br>Outbound Only    --> scaled score = 85<br>Inbound & Outbound  --> scaled score = 50<br>Inbound Only    --> scaled score = 25 |
| 725<br><br>NPA-NXX ranking | 730<br>Every NPA-NXX is placed into one of 10 buckets based on the overall history of all NPA-NXXs<br><br>Bucket 1 --> scaled score = 100<br>Bucket 2 --> scaled score = 90<br>Bucket 3 --> scaled score = 80<br>Bucket 4 --> scaled score = 70<br>Bucket 5 --> scaled score = 60<br>Bucket 6 --> scaled score = 50<br>Bucket 7 --> scaled score = 40<br>Bucket 8 --> scaled score = 30<br>Bucket 9 --> scaled score = 20<br>Bucket 10--> scaled score = 10 |
| 735<br><br>Length of time TN was in service | 740<br>The longer a telephone number has been in service, the longer it may take to clean.<br><br>For every month in service, the scaled score increments by one. A telephone number that's only been in service for one month or less receives a scaled score of 100 while a telephone number that's been in service for 100 months or more receives a scaled score of 0. |
| 745<br><br>Number of times TN has been recycled | 750<br>Each time a telephone number has been recycled, it's scaled score goes down.<br><br>First time recycled    --> scaled score = 100<br>Second time recycled  --> scaled score = 80<br>Third time recycled    --> scaled score = 60<br>Fourth time recycled  --> scaled score = 40<br>Fifth time recycled    --> scaled score = 20<br>More than five times  --> scaled score = 0 |
| 755<br><br>Reputation of prior TN owner | 760<br>Excellent    --> scaled score = 95<br>Good    --> scaled score = 75<br>Average    --> scaled score = 50<br>Below Average  --> scaled score = 25<br>Poor    --> scaled score = 5 |

| Parameter | Weighting Factor | Raw Score (0-100) | Example 1 810 | | Example 2 820 | | Example 3 830 | |
|---|---|---|---|---|---|---|---|---|
| | | | raw score | scaled score | raw score | scaled score | raw score | scaled score |
| Avg. Daily Calls (ADC) received within 90 days of disconnection | .30 | 0 - 100 | 95 | 28.50 | 70 | 21.00 | 55 | 16.50 |
| Prior TN use case | .25 | 0 - 100 | 85 | 21.25 | 50 | 12.50 | 25 | 6.25 |
| Prior owner reputation score | .20 | 0 - 100 | 75 | 15.00 | 50 | 10.00 | 5 | 1.00 |
| NPA-NXX ranking | .10 | 0 - 100 | 70 | 7.00 | 90 | 9.00 | 50 | 5.00 |
| Length of time TN in service | .10 | 0 - 100 | 60 | 6.00 | 75 | 7.50 | 15 | 1.50 |
| Number of times TN has been recycled | .05 | 0 - 100 | 80 | 4.00 | 60 | 3.00 | 20 | 1.00 |
| TOTALS | | | | 81.75 | | 63.00 | | 31.25 |

Profile Scale

A : 81-100
B : 51-80
910  C : 0-50

| | Scaled Score | Profile |
|---|---|---|
| Example 1 | 81.75 | 920 A |
| Example 2 | 63.00 | 930 B |
| Example 3 | 31.25 | 940 C |

FIG. 10

TECHNIQUES FOR MANAGING AN AGING TELEPHONE NUMBER BEFORE RETURNING TO ACTIVE SERVICE

TECHNICAL FIELD

Examples described herein are generally related to techniques for rehabilitating telephone numbers that have been taken out of service before returning them to active service.

BACKGROUND

In the United States, Telephone numbers (TNs) are a resource allocated to and managed by Telephony Carriers under authority of and authorized by the Federal Communications Commission (FCC). Customers of Telephony Carriers order telephone numbers to enable themselves and/or their customers to use interconnected telephony networks for calling and text messaging (e.g., SMS/MMS).

The usage and management of telephone numbers is of great importance to Telephony Carriers from both a reputational standpoint and a regulatory standpoint. Telephone numbers are often used and re-used once a particular customer no longer needs them. When telephone numbers are taken out of service, federal regulations require a minimum of forty-five (45) days before they can be put back in active service. This may be termed the minimum aging period and is intended to 'clean' telephone numbers. The forty-five (45) day period is intended to allow residual traffic to the telephone number to ebb so that when the telephone number is put back in service, it will be clean and its prior inbound calling history will have been mitigated such that new inbound traffic to the telephone number will be substantially independent from its prior use. However, aging alone does not provide any actual insight into how clean the telephone number is. For instance, a telephone number may be put back into service after 45 days even if it is still experiencing relatively high inbound call volumes. While perfectly acceptable under federal regulations, the customer experience may be dismal.

What is needed are automated techniques to accurately predict when a telephone number has sufficiently aged following its disconnection from service so it can be returned to active service with greater confidence as to its cleanliness.

SUMMARY

In some embodiments, techniques are described for managing out of service telephone numbers (TNs) before returning them to active service. These techniques may be embodied in a method, a computer-based system, and/or a non-transitory machine-readable medium capable of being loaded on and run by a computer.

A telephone number profile score may be calculated for an out of service TN entering an aging protocol, the aging protocol comprising a pre-determined number of days the TN must remain out of service. The out of service TN may then be assigned a profile based on its telephone number profile score, the profile indicative of how quickly the TN will achieve one or more quality thresholds. The assigned profiles may include one or more of a faster aging profile, an average aging profile, and a slower aging profile. The number of days from entry into the aging protocol it will take the TN to achieve the one or more quality thresholds based on its assigned profile may be determined. The quality threshold status of the TN may then be updated each time it crosses another of the quality thresholds. Once it completes the aging process, the TN may be placed into an inventory of TNs eligible for active service. Thereafter, the quality threshold status of the TN may continue to be updated each time it crosses one of the quality thresholds.

The telephone number profile score ($TN_{ps}$) for the TN may be based on historical data parameters of the TN. These parameters may include one or more of: (i) the average number of daily calls the TN was receiving within 90 days of being taken out of service; (ii) the prior use case most closely associated with the TN when it was in service; (iii) the area code and local exchange (i.e., NPA-NXX) of the telephone number; (iv) the length of time the TN was in service prior to being taken out of service; (v) the number of times the TN has been taken out of service in the past; and (vi) the reputation of the prior user of the TN. In addition, each of the historical data parameters may be weighted to reflect that parameter's influence with respect to how quickly the TN reaches the various quality thresholds.

The quality threshold statuses may include a minimum quality threshold status, an average quality threshold status, and a high quality threshold status. The rolling average of daily calls intended for the TN may be highest for the minimum quality threshold status and lowest for the high quality threshold status. The quality thresholds may be determined by a rolling average of daily calls intended for the TN that could be, for example, a 2-day, 3-day, etc. rolling average. Use of a rolling average is intended to smooth out the day to day volatility of the number of calls still intended for the TN.

BRIEF DESCRIPTION OF THE DRAWINGS

FIG. 7 illustrates a graph showing the average plots for three distinct profiles based on the multiple historical plots of telephone numbers that have undergone an aging process according to an embodiment.

DETAILED DESCRIPTION

Various embodiments may include a system, method, apparatus, and/or computer program product that describe and claim techniques to monitor and predict the progress of a telephone number as it ages following a disconnection from service.

Providing clean telephone numbers to customers signing up for inbound service is important to Telephony Carriers and their customers. For purposes of this disclosure, a Telephony Carrier is the entity that manages a telephone number (TN) including procuring the telephone number, putting it into service, disconnecting it from service, and aging it in inventory as regulated by the FCC. A telephony service provider may be an entity that procures telephone numbers from a Telephony Carrier and allocates them to customers and their end users for a particular purpose. For clarity, a Telephony Carrier can also be a telephony service provider. When customers/end users contract with a telephony service provider for telephone numbers in which inbound calling is part of the offering, having clean numbers that do not receive an inordinate amount of unwanted calls is important. Thus, the Telephony Carrier providing the telephone numbers should have an inventory that it is confident is clean. Clean generally implies that the telephone number will not still be receiving telephone calls based on its prior history and usage.

As mentioned, the only regulatory requirement for cleaning telephone numbers is the FCC mandated forty-five (45) day aging period. The theory being that after 45 days, the call volume to the disconnected number(s) will have abated to the point that a new user of the telephone number will not be inundated or inconvenienced with unwanted calls based on the prior history and usage of the telephone number. There are currently no other rules or regulations that govern when a telephone number may be returned to active service.

This blanket rule, however, does not necessarily achieve its goal for all telephone numbers. By far, continuing call volume to a discontinued telephone number is the most relevant factor in determining the cleanliness of the number. According to the theory, 45 days is a sufficient period for a telephone number to receive fewer inbound calls. However, this is not always the case because the history of telephone numbers may be vastly different in ways that impact the length of time it would take to satisfactorily clean a number.

Other factors such as, for instance, how many calls the telephone number was receiving prior to its disconnection (i.e., in service history), the NPA-NXX (i.e., area code and local exchange of the telephone number), the length of time it was in service prior to its disconnection, the prior use case of the telephone number (e.g., inbound only, outbound only, inbound/outbound, messaging), reputation of previous end user (if known), and the number of times it has been recycled (i.e., gone through the aging process) create a telephone number profile that may be used to predict how long a telephone number should age before it can be confidently returned to active service. Moreover, this profile may be used to create differing quality thresholds for aging telephone numbers. For instance, a carrier may wish to create minimum quality thresholds, average quality thresholds, and higher quality thresholds pertaining to the cleanliness of any given telephone number. As telephone numbers transition from aging to inventory, they may meet and exceed these different quality thresholds such that, at any given moment, a carrier may have inventories of all three qualities of telephone numbers.

This provides the carrier a degree of flexibility when allocating telephone numbers in response to requests. For example, a carrier may decide a request from a particular customer for a particular use case would be best served using only high quality threshold numbers. In another example, a carrier may decide that an outbound calling use case need only minimum quality numbers because they do not intend to use the telephone numbers to receive calls making it irrelevant if there is residual inbound traffic to those telephone numbers. Suffice it to say, a carrier can have many reasons for deciding what quality number best suits any given request.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

According to the embodiments described herein, when a telephone number enters the aging protocol it is subjected to a profile analysis designed to predict how long it would take to achieve various quality thresholds of cleanliness. The profile may be comprised of multiple weighted factors that include, but are not necessarily limited to, average number of daily calls the telephone number was receiving prior to its disconnection, its NPA-NXX, the length of time it was in service prior to its disconnection, the prior use case of the telephone number (e.g., inbound only, outbound only, inbound/outbound, messaging), the reputation of previous end user (if known), and the number of times it has been recycled (i.e., gone through the aging process).

The predicted profile weightings may be applied to a large dataset of already aged telephone numbers to measure the performance of the profile and recursively tweak the profile weightings until the profile converges on an optimal solution. The performance of the profile may then be judged against the actual number of inbound calls the telephone number is still receiving while it is aging.

Once a telephone number enters the aging protocol, it can be confidently predicted when it will achieve various thresholds of cleanliness allowing the carrier to maintain multiple buckets of clean telephone numbers. The carrier may then re-allocate those numbers more intelligently based on the use case of the customer requesting the telephone number.

Figure 1:
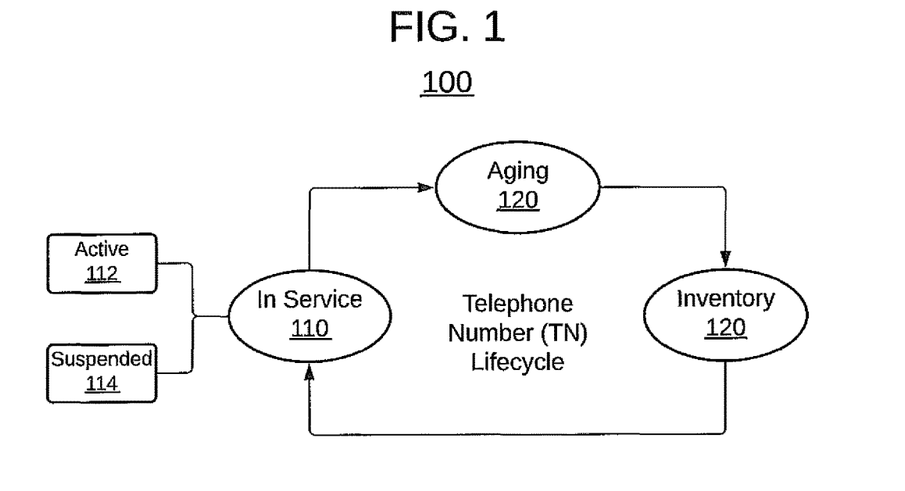
FIG. 1 illustrates an example of a telephone number lifecycle.

FIG. 1 illustrates an example of a telephone number lifecycle 100. A telephone number may be in one of three (3) states at any given moment that include (1) in service 110, (2) aging 120, or (3) in inventory 130. If a telephone number is in service 110, it may be either active 112 or suspended 114. A suspended 114 number may be deemed in service 110 because it is neither in the aging state 120 or in a carrier's inventory 130. An example of a suspended 114 number may be when a subscriber has fallen in arrears on their payments and the carrier suspends service until the account has been satisfied.

Figure 2:
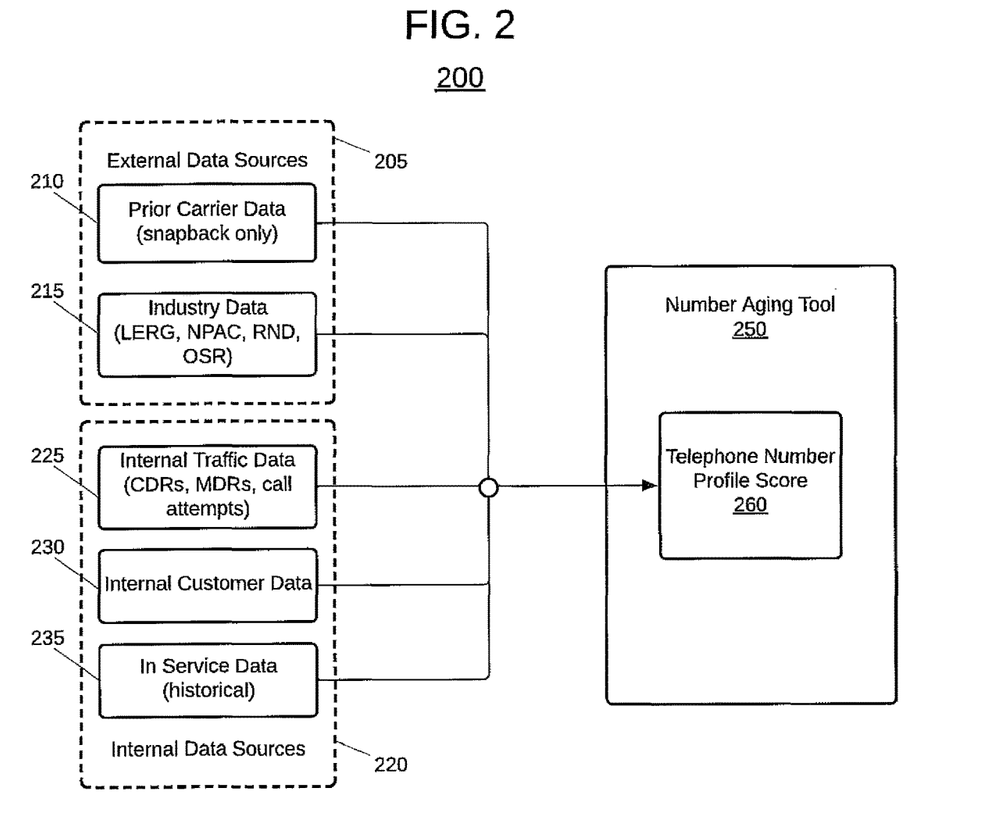
FIG. 2 illustrates data sources for a number aging tool according to an embodiment.

FIG. 2 illustrates some examples of data sources 200 for a number aging tool 250 according to an embodiment. The data sources 200 may be characterized as either external 205 or internal 220. An external data source 205 may be one that the carrier does not have direct ownership of the data. Some examples of external data sources 205 may include prior carrier data 210 and $3^{rd}$ party industry databases 215 such as the Local Exchange Routing Guide (LERG), the Number Portability Administration Center (NPAC), the Reassigned Numbers Database (RND), and the Override Services Registry (OSR). An internal data source 220 may be one that the carrier has direct ownership of the data. Some examples of internal data sources 220 may include traffic data 225 in the form of call detail records (CDRs) and message detail records (MDRs).

The raw data from these data sources may be analyzed and weighted in a manner that reflects the impact of a given data point (i.e., parameter) on how quickly and how well a telephone number will rehabilitate itself in the aging process. Data analytics can create and recursively test various data points and weighting factors against historical call data. The recursive process of altering parameter weighting functions is intended to cause a convergence such that the profile accurately reflects the historical data. Once this occurs, each telephone number entering the aging protocol can have the TN profile determined based on its historical record and a prediction can be made as to how many days in aging/inventory it will take that telephone number to achieve minimum, average, and high quality thresholds. This information may then be used by the carrier when placing numbers back into service following the minimum mandatory 45 day aging process. In addition, numbers that have been moved from aging to inventory will continue to get cleaner the more time they spend in inventory. This may also be tracked to allow the carrier to re-label a telephone number in inventory from minimum quality to average quality or average quality to high quality as time passes.

Figure 3:
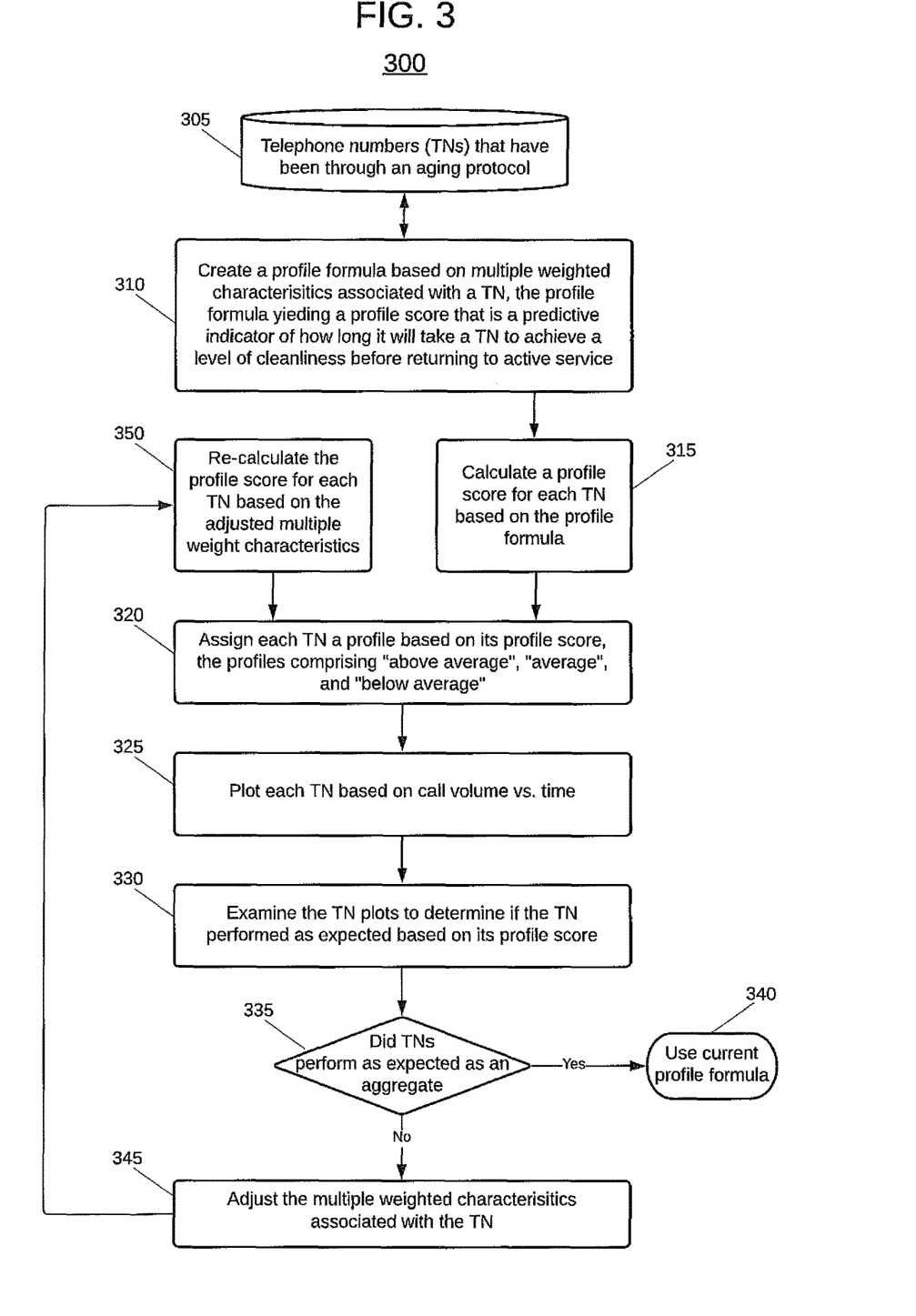
FIG. 3 illustrates a first logic flow diagram for using a historical dataset to create and train a telephone number aging profile according to an embodiment.

FIG. 3 illustrates a first logic flow diagram 300 for using a historical dataset to create and train a telephone number aging profile according to an embodiment. This logic flow may be representative of some or all of the operations executed by one or more logic, features, or devices described herein, such as any devices or systems described above with references to other figures herein. In the illustrated examples shown in FIG. 3, the logic flow 300 may comprise one or more steps or processes involved in allocating and managing resources in a communications network as described elsewhere herein. The embodiments, however, are not limited to the number, type, order or arrangement of steps shown in FIG. 3.

The process begins in step 310 by accessing a database 305 of telephone numbers that have been through the aging protocol to create a telephone number (TN) aging profile intended to predict the number of days it will take to clean a telephone number to one or more user-defined quality thresholds when they enter the aging protocol. The database 305 may comprise, for instance, data points corresponding to one or more of: (i) the number of daily calls it received while aging, (ii) CDR and/or MDR data for prior in-service history, previous customer information, (iii) NPA-NXX of the telephone number, (iv) the length of time a telephone number was in service prior to its disconnection, (v) the prior use case of the telephone number (e.g., inbound only, outbound only, inbound/outbound, messaging), (vi) the reputation of previous customer, and (vii) the number of times the telephone number has been recycled.

Each data point may be characterized as a parameter that, collectively, may be assembled into the TN aging profile. The TN aging profile is a formula of sorts that weights each parameter on a normalized scale between 0-1 where the sum of all weighting factors will equal one (1). A quality threshold may be measured by a rolling average of the number of incoming calls a telephone number still receives even though it has been taken out of service. Initially, each parameter is given an estimated weighting factor intended to reflect the relevance of that factor to the aging process. As stated above, the weighting factors are normalized to ensure they sum to 1.

Once the weighting factors have been allocated, the process of generating a normalized TN profile score occurs at step 315. This involves examining the history of a given TN and consulting a scoring table like that in FIG. 8, for example. Each parameter for the TN may be assigned a value between 0-100 based on its history as contained in database 305. The scoring table may be used to convert the historical parameter data into a scaled score. For example, for the prior use case parameter, there may be five (5) discrete prior use cases for a TN. Each of those use cases may be assigned a scaled score between 0-100 meant to reflect which use case will cause the TN to achieve quality thresholds quicker. This scaled score may then be multiplied by the parameter weighting factor which is based on the parameter's overall effect on achieving quality thresholds.

This process is repeated for each parameter until a total weighted normalized scaled score for the TN may be determined by summing the various parameter scaled scores. The total weighted normalized scaled score for the TN may be a number between 0-100. In this example, it has been arbitrarily chosen that a higher total scaled score is better meaning that the higher the total scaled score, the quicker the TN may achieve various quality thresholds in aging. This is described in greater detail below.

Using the historical aging data of actual telephone numbers, it may be observed that TNs group themselves into aging patterns. For instance, if one were to plot the historical TN aging data for 1,000 actual TNs, it may be observed that there are, for instance, three typical aging patterns where the TNs cross various quality thresholds within short periods of one another. Based on these groupings, three distinct profiles may be denoted as profile A, profile B, and profile C where profile A TNs are predicted to achieve quality thresholds quicker than profile B which are predicted to achieve quality thresholds quicker than profile C. It may be estimated that profile A may be achieved with scaled scores between 81-100, profile B may be achieved with scaled scores between 51-80, and profile B may be achieved with scaled scores between 0-50. The above number ranges are exemplary and illustrative only. For instance, there may be more or less than three aging patterns.

In step 320, each TN may be assigned a profile based on the normalized TN profile score. For instance, there may be three profiles A, B, and C corresponding respectively to above average, average, and below average. Each TN is then plotted based on the number of incoming calls directed to the number during the aging protocol in step 325. Specifically, this may be the 3-day rolling average of incoming calls so as to smooth any spikes during the aging protocol. Similarly, it could be a 5-day, 7-day, or other period rolling average. The exact parameters may be tuned to achieve a desired result without departing from the spirit or scope of what is disclosed herein. Each TN's aging plot may then be examined to determine if it performed as expected based on its profile score in step 330. For instance, did TNs with an above average profile score cross quality thresholds faster and in-line with expectations. The same analysis may be applied to the average and below average TN profiles.

It may then be determined in decision step 335 whether the collection of TNs performed sufficiently close to as expected as an aggregate. If the answer to decision step 335 is yes, the system may use the current TN aging profile developed in step 310. If the answer to decision step 335 is no, control is sent to step 345 where the weighting factors for each of the parameters may be altered. The new weighting factors may then be used to re-calculate the profile score for each TN in step 350 followed by re-assessing the TN profile based on a new TN profile score at step 320. Steps 325 and 330 are similarly repeated and the results determined in step 335 may be analyzed. The process repeats until the weighting factors successfully provide TN profiles that satisfactorily converge to the expected results and a current TN profile formula is settled upon at step 340.

Figure 4:
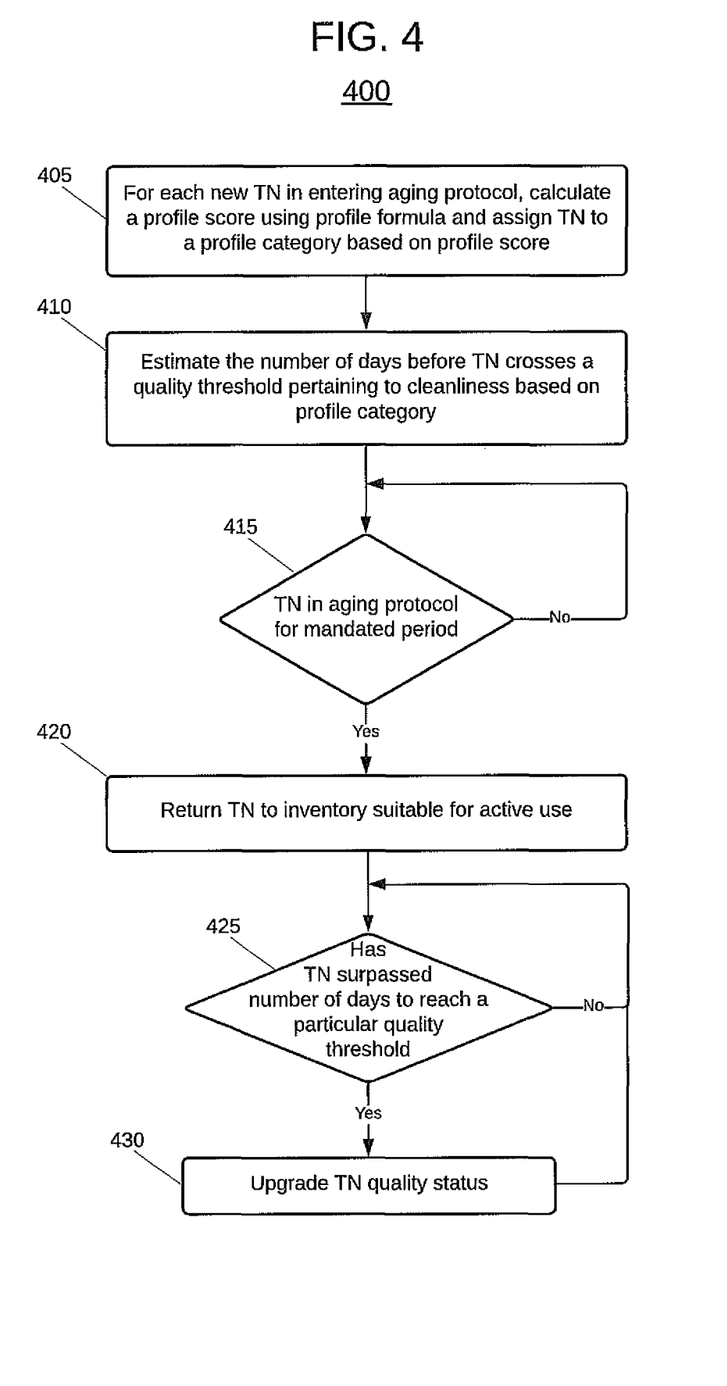
FIG. 4 illustrates a second logic flow diagram 400 for using a historical dataset to create and train a telephone number aging profile according to an embodiment.

FIG. 4 illustrates a second logic flow diagram 400 for using a historical dataset to create and train a telephone number aging profile according to an embodiment. This logic flow may be representative of some or all of the operations executed by one or more logic, features, or devices described herein, such as any devices or systems described above with references to other figures herein. In the illustrated examples shown in FIG. 4, the logic flow 400 may comprise one or more steps or processes involved in allocating and managing resources in a communications network as described elsewhere herein. The embodiments, however, are not limited to the number, type, order or arrangement of steps shown in FIG. 4.

Once the TN profile formula has been set according to the processes set out in FIG. 3, it may be applied to each new TN entering the aging protocol to predict how quickly it will reach certain thresholds of cleanliness. Recall, the sole metric that measures cleanliness is a rolling average of the number of calls still intended for the telephone number even after its been taken out of service. The rolling average may be, for example, a 3-day, 5-day, 7-day, or any other rolling average. For each new TN entering the aging protocol, its profile score is calculated based on its prior history and it is assigned a profile based on the profile score at step 405. Once assigned a profile, it may then be predicted or estimated the number of days the TN will be in the aging protocol before achieving various quality thresholds of cleanliness at step 410. The TN is checked each day to determine if it has been in the aging protocol for the minimum statutorily mandated period (e.g., forty-five (45) days) in decision block 415. If not, nothing happens until it achieves the mandated aging period. One day after the mandated aging period, the TN may be moved back into inventory and made eligible to return to service at step 420. Once in inventory, the TN is again checked each day to determine if it has reached the number of days to cross the various quality thresholds for its profile at decision block 425. If the TN has already previously achieved or just crossed a particular quality threshold status, it's status is updated to reflect that achievement at step 430. Once in inventory, each TN is checked daily based on its designated profile to determine which quality status it should be assigned. This means decision step 425 and step 430 are performed daily for each TN in inventory.

Figure 5:
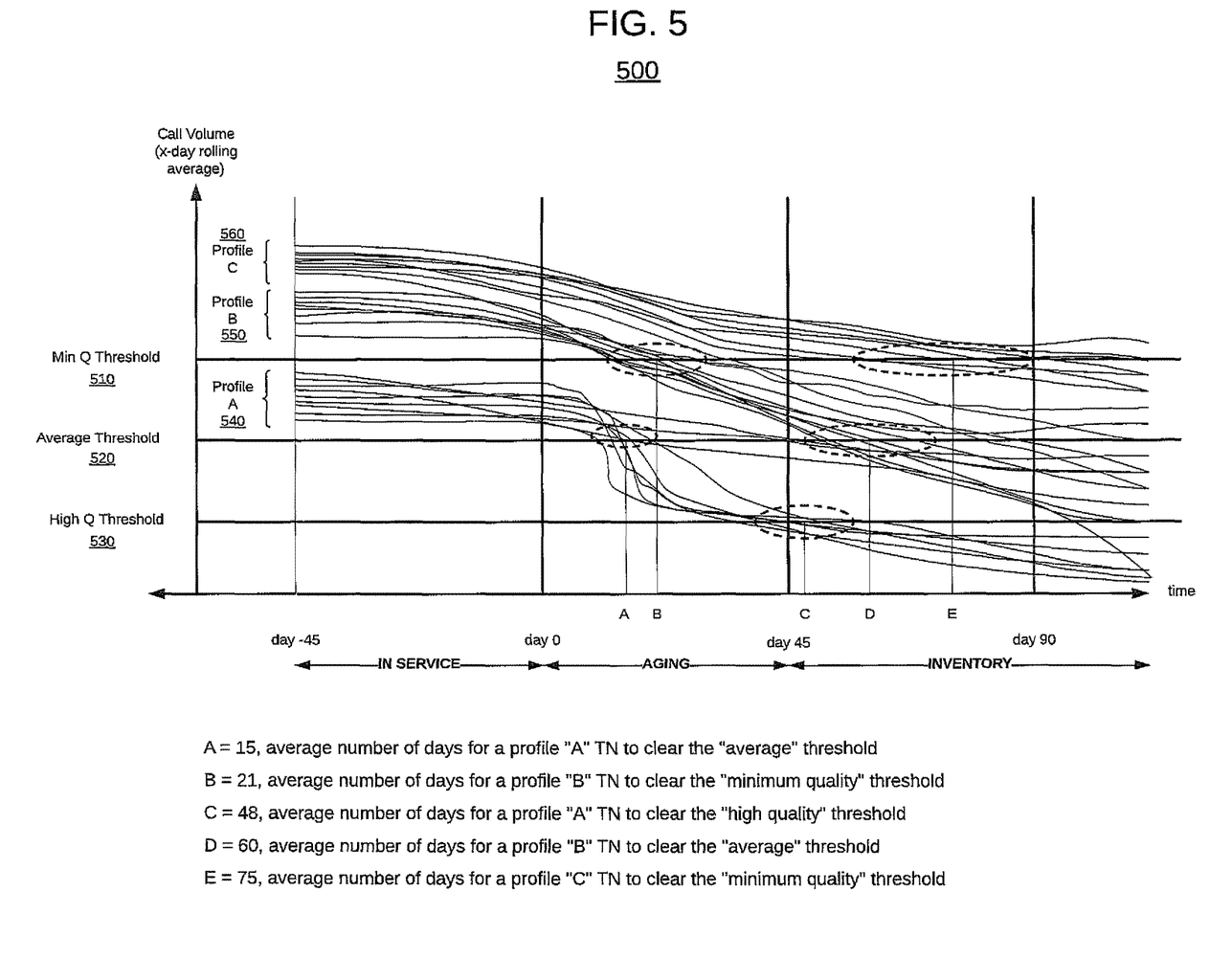
FIG. 5 illustrates a first graph showing multiple historical plots of telephone numbers that have undergone an aging process according to an embodiment.

FIG. 5 illustrates a graph 500 showing multiple historical plots of telephone numbers that have undergone an aging process according to an embodiment. FIGS. 3-4 have described the process of predicting how long it will take a telephone number to reach certain quality thresholds while in a mandated aging protocol followed by its return to inventory. FIGS. 5-9 describe in more detail examples of specific data points that may be used in the processes of FIGS. 3-4. It is important to note that the types of data points and the relative weighting factors afforded them may vary depending on a desired level of cleanliness as defined by user determined quality thresholds. Thus, one of the advantages of the techniques described herein is that it is tunable to suit different needs without altering the functioning of the processes. For instance, if one were to desire a super high quality threshold, one need only move the threshold (or create a new threshold) to a lower number for the rolling average of daily calls.

For clarity and ease of reading, FIG. 5 illustrates plots for a sampling of approximately twenty-seven (27) TNs that have undergone a 45-day aging period followed by placement back into inventory. The x-axis of the graph represents the quality metric as defined by the rolling average of the number of daily calls a TN is receiving. One or more quality thresholds may be defined on this axis. In this example, three (3) distinct quality thresholds have been defined: a high quality threshold; an average quality threshold; and a minimum quality threshold. Each threshold is defined by an acceptable number of average daily calls that may be received. The actual number(s) of average daily calls associated with these thresholds may be programmed into the system. These numbers may be re-programmed as desired.

Three distinct groupings of the TNs may be identified as aging similarly among each other within a grouping, but differently when compared as a group with other groupings. These three groupings may be characterized as profiles—specifically, profile A 540, profile B 550, and profile C 560.

Upon visual inspection of the aggregation of the individual TN plots, it may be seen that there are discernible inflection points (e.g., A-E) where pluralities of TNs cross the various thresholds within short periods of one another. A goal of the techniques described herein is to understand why those TNs tend to hit those inflection points in groups so that when a new TN enters the protocol, it may be predicted when it will achieve the various quality thresholds. Put another way, what is it about those TNs that tend to make them age in similar patterns. If the historical characteristics for the TNs can be understood and contextualized to read on the actual graphs, predicting how a subsequent TN entering the aging protocol will age becomes possible.

In the example in FIG. 5, five (5) distinct inflection points have been identified and labeled A-E on the graph. For instance, inflection point A suggests that TNs assigned to profile A cross the "average quality" threshold approximately 15 days after entering the aging protocol. Inflection point B suggests that TNs assigned to profile B cross the "minimum quality" threshold approximately 21 days after entering the aging protocol. Inflection point C suggests that TNs assigned to profile A cross the "high quality" threshold approximately 48 days after entering the aging protocol. For a 45-day aging protocol this would be 3 days after the TN(s) transition from aging to inventory. Inflection point D suggests that TNs assigned to profile B cross the "average quality" threshold approximately 60 days after entering the aging protocol or 15 days after the TN(s) transition from aging to inventory based on the exemplary 45-day aging period. Inflection point E suggests that TNs assigned to profile C cross the "minimum quality" threshold approximately 75 days after entering the aging protocol or 30 days after the TN(s) transition from aging to inventory based on the exemplary 45-day aging period.

Figure 6:
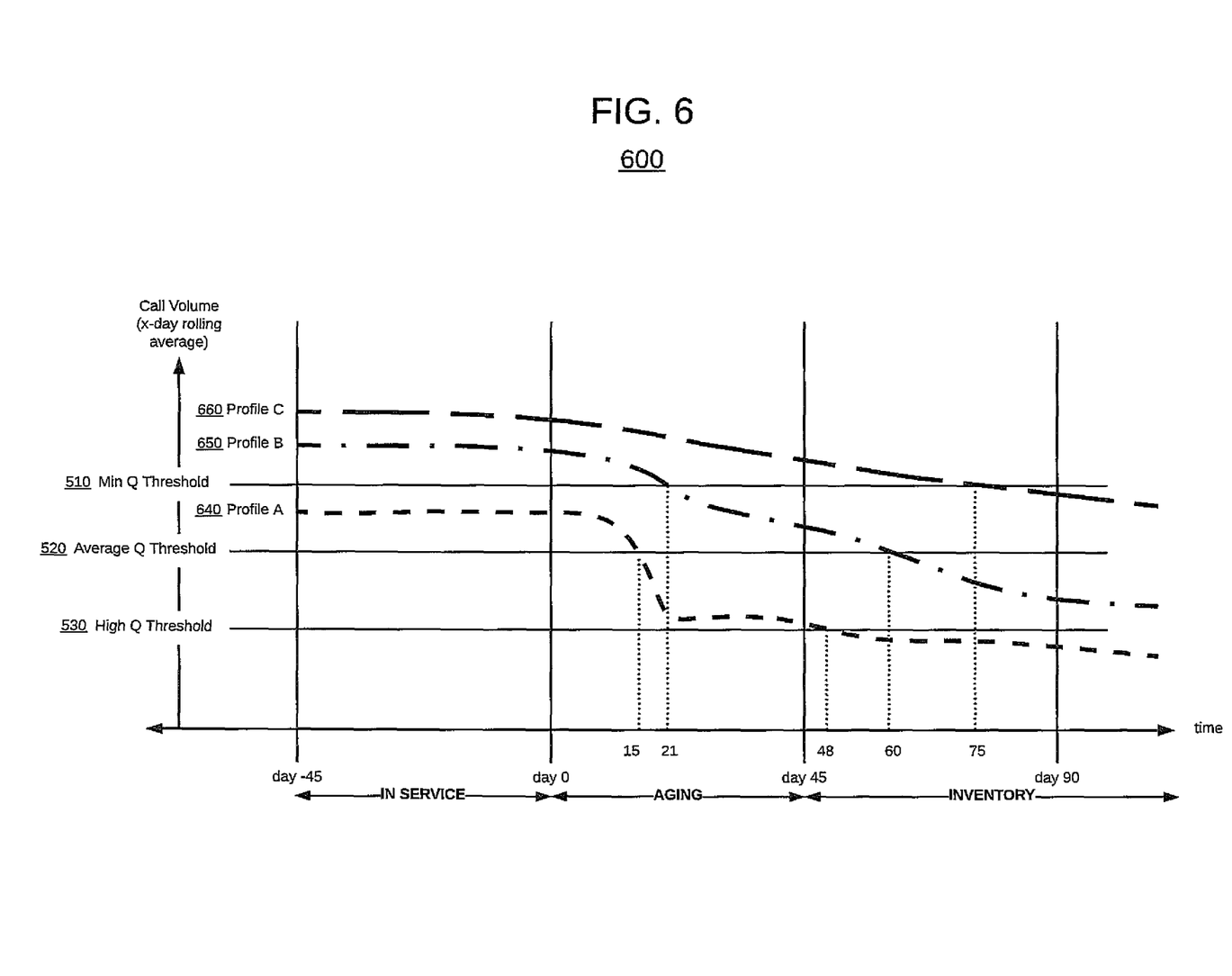
FIG. 6 illustrates a second graph showing multiple historical plots of telephone numbers that have undergone an aging process according to an embodiment.

FIG. 6 illustrates a graph 600 showing generalized plots for the three distinct profiles based on the averages of the multiple historical plots of telephone numbers that have undergone an aging process according to an embodiment. Put another way, the various TN plots for each profile have been distilled into a single representative plot. Specifically, a generalized profile C plot 660 has been created by averaging all the individual profile C plots 560 illustrated in FIG. 5. A generalized profile B plot 650 has been created by averaging all the individual profile B plots 550 illustrated in FIG. 5. Lastly, a generalized profile A plot 640 has been created by averaging all the individual profile A plots 540 illustrated in FIG. 5.

Reducing the plot groupings to a single plot makes it easier to see where each representative plot crosses the various inflection points associated with the various quality thresholds. For instance, generalized profile plot C 660 crosses the minimum quality threshold 75 days after entering the aging protocol. Generalized profile plot B 650 crosses the minimum quality threshold 21 days after entering the aging protocol and the average quality threshold 60 days after entering the aging protocol. Generalized profile plot A 640 crosses the average quality threshold 15 days after entering the aging protocol and the high quality threshold 48 days after entering the aging protocol.

FIG. 7 illustrates a table describing a plurality of parameters and associated criteria that affect how long it takes a telephone number achieve various levels of quality according to an embodiment. For the use case to which the techniques described herein apply, six (6) characteristics or parameters associated with a telephone number (TN) may be factored in to determining how a TN will age when it is taken out of service. These six parameters may include: the average number of daily calls the TN was receiving within 90 days of being taken out of service 705; the prior use case most closely associated with the TN when it was in service 715; the area code and local exchange (i.e., NPA-NXX) of the telephone number 725; the length of time the TN was in service prior to being taken out of service 735; the number of times the TN has been taken out of service in the past 745; and the reputation of the prior user of the TN 755.

To create a profile score formula, each parameter (p) may be normalized to the same scale meaning each parameter receives a score ($p_s$) between, for example, 0-100. Thereafter, each parameter may be weighted using a weighting factor ($w_f$) on a normalized scale between 0-1 where the sum of all the weighting factors for each parameter must equal 1, ($\Sigma w_f = 1$). The total profile score ($TN_{ps}$) for a given TN then would be the sum of each parameter's scaled score ($P_s$) multiplied by that parameter's weighting factor ($w_f$), $TN_{ps} = \Sigma p_s w_f$. Using the normalized scaled scores for parameters and weighting factors, the total profile score ($TN_{ps}$) for a given TN would necessarily fall between 0-100.

There are two variable components to the $TN_{ps}$ equation—the weighting factor ($w_f$) for each parameter and the basis for assessing a scaled score ($p_s$) for each parameter. The assessments for each of these variable components directly determines the total profile score ($TN_{ps}$) for a given TN which may then be analyzed using the historical data plots to determine if the total profile score ($TN_{ps}$) for a given TN is reflective of the actual data. If not, the assessments for each of these variable components may be slightly amended and re-analyzed against the actual data. This is the process described in FIG. 3 and it may be repeated until the total profile score ($TN_{ps}$) produced satisfactorily reflect the actual historical data.

For exemplary purposes, FIG. 7 illustrates one iteration of scaled score data for each parameter. This example posits six (6) parameters that may be labeled $p1_s$, $p2_s$, $p3_s$, $p4_s$, $p5_s$, and $p6_s$.

For the average number of daily calls the TN was receiving within 90 days of being taken out of service parameter ($p1_s$) 705, a $p1_s$ scaled score 710 has been determined that assigns a $p1_s$ score in which the higher number of average daily calls (ADC) yields a lower $p1_s$ score. Specifically, in this example, an ADC of 0 would yield a $p1_s$ score of 100 as that is the best score possible. For each incremental increase in ADC, the $p1_s$ score decreases such that an ADC of 1 yields a $p1_s$ score of 99 all the way down to an ADC greater than or equal to 100 yielding a $p1_s$ score of 0.

For the prior use case most closely associated with the TN when it was in service parameter ($p2_s$), a $p2_s$ scaled score 720 discretely ranks and assigns a score based on the use case of the TN when it was last in service. In this example, there are four (4) use cases: messaging only; outbound only; inbound and outbound; and inbound only. The messaging (e.g., SMS/MMS) use case has been assigned a $p2_s$ of 95 because that use case likely will clean faster because voice services were not part of the prior use case. The outbound only use case has been assigned a $p2_s$ of 85 because that use case only permitted outbound calls to be made as part of the prior use case meaning the number was typically not being dialed by others. The inbound and outbound use case has been assigned a $p2_s$ of 50 because that use case permitted the prior user to both make and receive calls. The inbound only use case has been assigned a $p2_s$ of 25 because that use case only permitted inbound calls suggesting that the expected number of calls to the number may be higher than that for other use cases.

For the area code and local exchange (i.e., NPA-NXX) of the telephone number parameter 725 ($p3_s$), each TN is placed into one of ten (10) buckets where each bucket is assessed a $p3_s$ scaled score 730 that reflects ten discrete levels ranging from 100 to 10 separated by increments of ten. For instance, the bucket containing TNS associated with the NPA-NXXs most likely to become clean fastest are given a $p3_s$ scaled score of 100. Each successive bucket has a $p3_s$ scaled score that is 10 lower. Each NPA-NXX has been previously associated with a bucket such that when a TN entering the aging protocol is assessed, its NPA-NXX scaled score may be simply set by determining which bucket it is in. Certain NPA-NXXs naturally receive higher traffic than others which helps determine in which bucket that NPA-NXX should be placed. For instance, the 212 area code (i.e., NPA for parts of New York City) may be more popular than the area code 828 (i.e., the NPA for the western portion of North Carolina). Thus, 212-NXX TNs may be placed in a bucket having a lower $p3_s$ scaled score than 828-NXX TNs.

For the length of time the TN was in service prior to being taken out of service parameter 735 ($p4_s$), a $p4_s$ scaled score 740 is applied that is lower the longer the TN was in service for its prior owner in its last use case. For instance, the $p4_s$ scaled score starts at 100 for TNs that have been in service for less than one month and that $p4_s$ scaled score decrements by one for each additional month the TN has been in service until the $p4_s$ scaled score goes to zero if the TN has been in service for more than 99 months (i.e., a little over 8 years).

For the number of times the TN has been taken out of service in the past parameter 745 ($p5_s$), a $p5_s$ scaled score 750 may be applied based on the number of times a TN has been recycled. Recycled refers to the number of times a TN has undergone an aging protocol due to being taken out of service. One hypothesis is that TNs that have been recycled more do not rehabilitate as quickly as TNs that have been recycled less often. TNs associated with multiple prior users may still be receiving residual traffic at higher rates than TNs associated with fewer prior users. In this initial example, a $p5_s$ scaled score of 100 may be associates with TNs that are being recycled for the first time. For each additional time a TN has been recycled, its $p5_s$ scaled score may be reduced by 20 points meaning that a TN that has been recycled more than five times will have a $p5_s$ scaled score of zero.

For the reputation of the prior user of the TN parameter 755 ($p6_s$), a $p6_s$ scaled score 760 may be assessed based on historical assessment of the prior user of the TN. In this example, a prior user's reputation may be characterized as one of five levels, each with a corresponding $p6_s$ scaled score. These levels include: excellent where the $p6_s$ scaled score is set to 95, good where the $p6_s$ scaled score is set to 75, average where the $p6_s$ scaled score is set to 50, below average where the $p6_s$ scaled score is set to 25, and poor where the $p6_s$ scaled score is set to 0. In cases where there may be no data for the prior user, the $p6_s$ scaled score may be set to a default of 50.

All of the aforesaid parameter scaled scores may be re-assessed and amended to better fit the actual results of the historical data. The intial values may be educated estimates. Once the total profile score ($TN_{ps}$) is determined according to the first iteration of the formula, it can be run against the historical data to determine if the total profile score ($TN_{ps}$) satisfactorily reflects the historical results of the TN. If it does not, the parameter scaled scores for each parameter may be slightly amended leading to new total profile scores ($TN_{ps}$) that may be compared to see if they perform any better with respect to the historical results of the TNs. For example, the scaled scores for parameter ($p2_s$), the prior use case most closely associated with the TN when it was in service, may need adjusting. The $p2_s$ scaled scoring may be adjusted such that the messaging only use case will be adjusted to a $p2_s$ of 90, the outbound only use case will be adjusted to a $p2_s$, of 75, the inbound and outbound use case will be adjusted to a $p2_s$ of 40, and the inbound only use case will be adjusted to a $p2_s$ of 10. Other parameter scaled scores may be similarly adjusted and the resulting $TN_{ps}$, scores may be evaluated against the historical data to see if the results more satisfactorily reflect the actual results. The process of adjusting parameters and re-evaluating the resulting $TN_{ps}$-scores is intended to converge on the actual results of a test set of TNs that have undergone the aging protocol.

Figure 8:
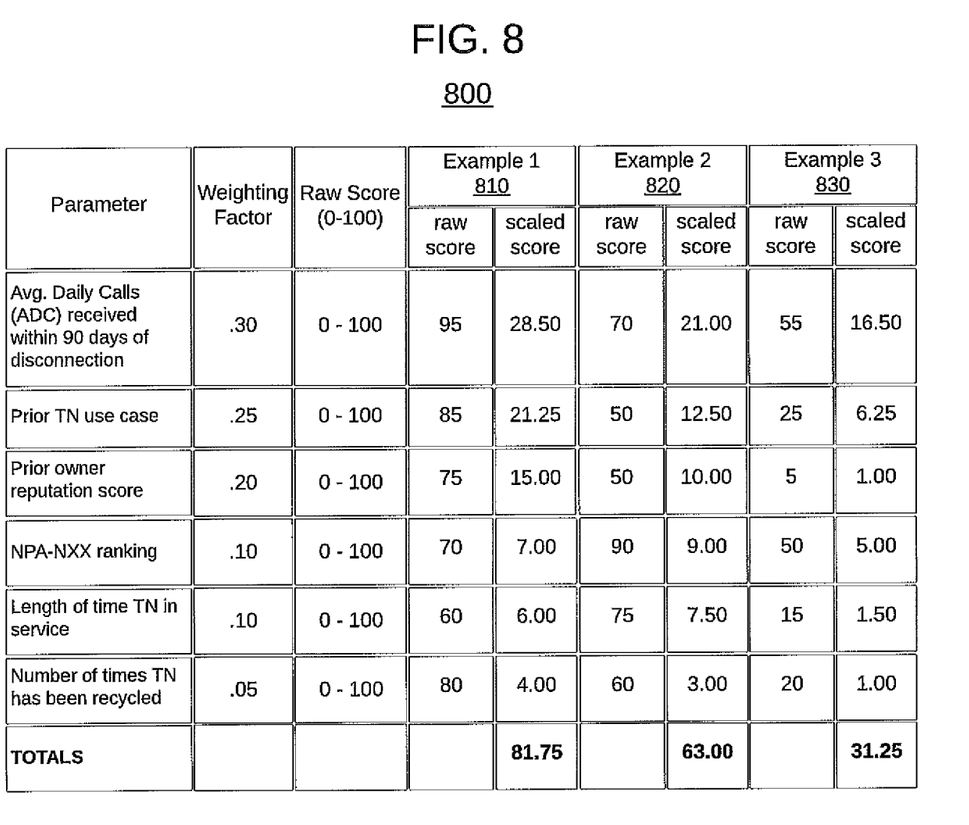
FIG. 8 illustrates a table describing a plurality of parameters and associated criteria that affect how long it takes a telephone number to achieve various levels of quality according to an embodiment.

FIG. 8 illustrates a table showing three (3) examples of scoring a telephone number about to enter an aging protocol according to an embodiment. The values in FIG. 8 use the parameter scaled scores described in FIG. 7. Each of the six parameters has been assigned a normalized weighting factor intended to weight certain parameters more than others. To maintain uniformity in scoring, the sum of all the parameter weighting factors must equal 1, ($\Sigma w_f = 1$). The total profile score ($TN_{ps}$) for a given TN then would be the sum of each parameter's raw score ($p_s$) multiplied by that parameter's weighting factor ($w_f$) and the total profile score ($TN_{ps}$) for a given TN would necessarily fall between 0-100. Just as the individual parameter scaled scores may be adjusted to better represent the actual historical TN data, so too can the weighting factors be adjusted. For instance, it may be determined that the NPA-NXX parameter has a greater influence on how quickly a TN ages requiring its weighting factor to be increased. Any increase in one parameter necessitates an equivalent decrease in one or more of the other parameters and vice versa.

For this particular example in FIG. 8, the parameters have been assigned initial weighting factors ($w_f$) as follows: the $w_f$ for the average number of daily calls the TN was receiving within 90 days of being taken out of service may be set at 0.30. The $w_f$ for the prior use case most closely associated with the TN when it was in service may be set at 0.25. The $w_f$ for the area code and local exchange (i.e., NPA-NXX) of the telephone number may be set at 0.10. The $w_f$ for the length of time the TN was in service prior to being taken out of service may be set at 0.10. The $w_f$ for the number of times the TN has been taken out of service in the past may be set at 0.05. Lastly, the $w_f$ for the reputation of the prior user of the TN may be set at 0.20.

The specific examples 810, 820, and 830 each correspond to an individual TN that has its own distinct history with respect to the six parameters thought to influence how the TN ages.

Turning to example 810, the raw score column in the table for a first TN may be populated with parameter raw scores determined using the data shown in FIG. 8. For instance, the raw score associated with the average number of daily calls the TN was receiving within 90 days of being taken out of service is 95 and the weighting factor for that parameter is 0.30 yielding a scaled score of 28.50. That means the TN was receiving an average of 5 calls per day in the 90 days prior to disconnection from service. The raw score associated with the prior TN use case is 85 and the weighting factor for that parameter is 0.25 yielding a scaled score of 21.25. That means the prior use case was outbound calling only. The raw score associated with the prior owner's reputation is 75 and the weighting factor for that parameter is 0.20 yielding a scaled score of 15.00. That means the reputation of the prior owner was characterized as 'good'. The raw score associated with the NPA-NXX of the TN is 70 and the weighting factor for that parameter is 0.10 yielding a scaled score of 7.00. That means the NPA-NXX of the TN was in the bucket corresponding to a raw score of 70. The raw score associated with the length of time the TN was in service is 60 and the weighting factor for that parameter is 0.10 yielding a scaled score of 6.00. That means the TN was in service for 40 months prior to disconnection. The raw score associated with the number of times the TN has been recycled is 40 and the weighting factor for that parameter is 0.10yielding a scaled score of 4.00. That means the TN will be recycled for a fourth time. The sum of the scaled scores yields the total profile score ($TN_{ps}$) for the TN as 81.75.

The same analysis may be applied to examples 2 and 3 (820, 830) to yield a $TN_{ps}$ of 63 and 31.25 respectively. These scores may then be applied to a profile scale shown in FIG. 9.

Figure 9:
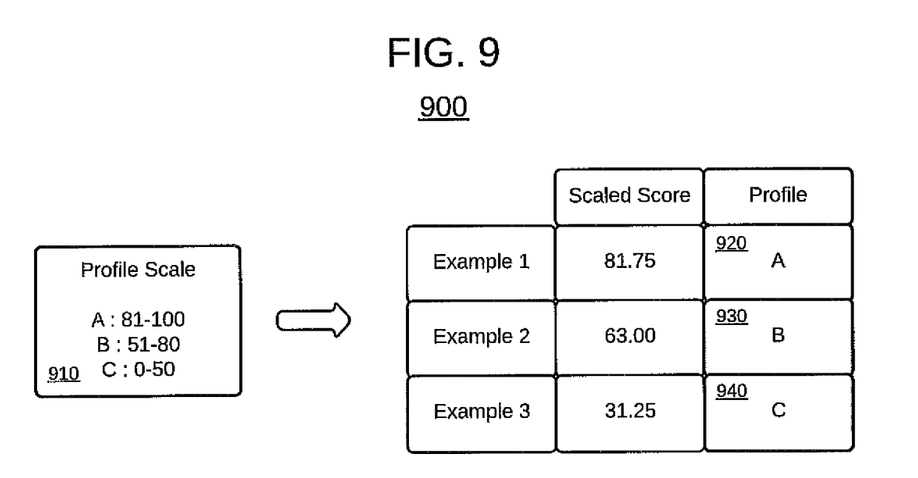
FIG. 9 illustrates a table showing three (3) examples of scoring a telephone number about to enter an aging protocol according to an embodiment.

FIG. 9 illustrates a table for assigning a profile to a total profile score ($TN_{ps}$) for a telephone number according to an embodiment. In this example, it has been determined that a $TN_{ps}$ between 0-50 is representative of a profile (profile C) that generally takes longer to achieve the various quality thresholds. A $TN_{ps}$ between 51-80 is representative of a profile (profile B) that generally achieves the various quality thresholds in an average time frame. A $TN_{ps}$ between 81-100 is representative of a profile (profile A) that generally achieves the various quality thresholds faster. Thus, example TN 1 810 is a profile A TN, example TN 2 820 is a profile B TN, and example TN 3 830 is a profile C TN.

These profiles may then be applied to the representative plot shown in FIG. 6 to estimate the number of days it will take for each of the example TNs to achieve various cleanliness quality thresholds. The profile A TN 810 will start the aging process (day 0) already having achieved the minimum quality threshold. It will reach the average quality threshold in 15 days and the high quality threshold in 48 days which is 3 days after it is returned to inventory based on a mandated 45-day aging period. The profile B TN 820 will achieve the minimum quality threshold 21 days into the aging process. It will reach the average quality threshold in 60 days which is 15 days after it is returned to inventory based. The profile C TN 830 will achieve the minimum quality threshold 75 days into the aging process which is 30 days after it is returned to inventory based.

The exemplary graphs of FIGS. 5-6 stop around 90 days but could easily be extended to determine how much longer it would take for certain profiles to cross additional thresholds. Having the ability to confidently predict the degree of cleanliness of a TN when it exits the aging protocol and enters inventory is valuable to the telephony carrier. The telephony carrier can better match TN allocations based on the proposed use case of the new user of the TN.

Figure 10:
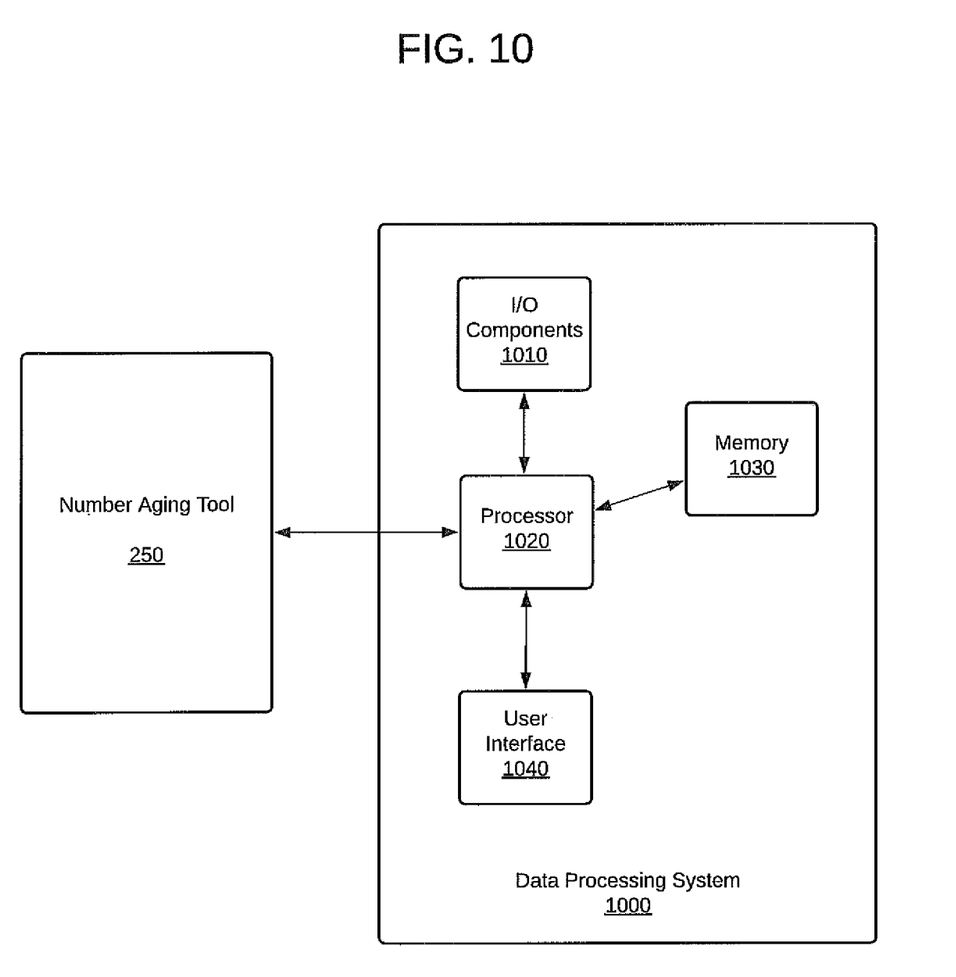
FIG. 10 illustrates a table for assigning a profile to a scaled score for a telephone number according to an embodiment.

FIG. 10 illustrates an example of a computer based data processing system 1000 suitable for use with any of the examples described above. Although the example data processing system 1000 is shown as in communication with a number aging tool 250 in accordance with embodiments of the present inventive concept, the data processing system 1000 may also be part of the number aging tool 250 without departing from the scope of the present inventive concept. In some examples, the data processing system 1000 can be any suitable computing device for performing operations according to the embodiments discussed herein described herein.

As illustrated, the data processing system 1000 includes a processor 1020 communicatively coupled to I/O components 1010, a user interface 1040 and a memory 1030. The processor 1020 can include one or more commercially available processors, embedded processors, secure processors, microprocessors, dual microprocessors, multi-core processors, other multi-processor architectures, another suitable processing device, or any combination of these. The memory 1030, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 1020.

I/O components 1010 may be used to facilitate wired or wireless connections to devices such as one or more displays, game controllers, keyboards, mice, joysticks, cameras, buttons, speakers, microphones and/or other hardware used to input or output data. Memory 1030 represents nonvolatile storages such as magnetic, optical, or other storage media included in the data processing system and/or coupled to processor 1020.

The user interface 1040 may include, for example, a keyboard, keypad, touchpad, voice activation circuit, display or the like and the processor 1020 may execute program code or instructions stored in memory 1030.

It should be appreciated that data processing system 1000 may also include additional processors, additional storage, and a computer-readable medium (not shown). The processor(s) 1020 may execute additional computer-executable program instructions stored in memory 1030. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method of managing out of service telephone numbers, comprising:
    as implemented by one or more processors configured with specific computer-executable instructions,
    identifying an out of service telephone number;
    obtaining a return-to-service function corresponding to the out of service telephone number, wherein the return-to-service function indicates how to calculate a profile score for the out of service telephone number and identifies criteria to use in calculating the profile score;
    calculating the profile score for the out of service using the return-to-service function and the criteria;
    assigning a profile of a plurality of profiles to the out of service telephone number based on the profile score, wherein each profile corresponds to different aging timelines for a plurality of quality-related statuses, wherein each quality-related status corresponds to a different level of confidence as to a cleanliness of an associated telephone number;
    associating a quality-related status of the plurality of quality-related statuses with the out of service telephone number based on the assigned profile and timing information relating to a length of time since the out of service telephone number was taken out of service, wherein the associated quality-related status changes according to the respective aging timeline corresponding to the assigned profile; and
    determining timing information relating to eligibility for returning the out of service telephone number into active service, wherein the out of service telephone number is added an inventory of telephone numbers eligible for active service based on an expiration of a time period corresponding to the timing information.

2. The method of claim 1, wherein the criteria comprises at least one of (i) an average number of daily calls the out of service telephone number was receiving within 90 days of being taken out of service; (ii) a prior use case most closely associated with the out of service telephone number when it was in service;
    (iii) an area code (NPA) of the out of service telephone number; (iv) a length of time the out of service telephone number was in service prior to being taken out of service; (v) a number of times the out of service telephone number has been taken out of service in the past; and (vi) a reputation of a prior user of the out of service telephone number.

3. The method of claim 1, wherein the criteria comprises a local exchange portion (NXX) of the out of service telephone number.

4. The method of claim 1, wherein the criteria comprises plurality of historical data parameters, and wherein the return-to-service function assigns a weighted factor to each of the historical data parameters.

5. The method of claim 1, wherein said associating the quality-related status is based on a rolling average of daily calls intended for the out of service telephone number.

6. The method of claim 5, wherein the rolling average of daily calls intended for the out of service telephone number is between a one (1) day and a ten (10) day rolling average inclusive.

7. The method of claim 5, wherein the plurality of quality-related statuses comprises a low quality threshold status, medium quality threshold status, and a high quality threshold status, wherein the rolling average of daily calls intended for the out of service telephone number is highest for the low quality threshold status and lowest for the high quality threshold status.

8. A computer system configured to manage out of service telephone numbers, comprising:
one or more processors; and
a non-transitory computer readable medium to store a set of instructions executable by the one or more processors, the set of instructions to cause the one or more processors to:
identify an out of service telephone number;
obtain a return-to-service function corresponding to the out of service telephone number, wherein the return-to-service function indicates how to calculate a profile score for the out of service telephone number and identifies criteria to use in calculating the profile score;
calculate the profile score for the out of service using the return-to-service function and the criteria;
assign a profile of a plurality of profiles to the out of service telephone number based on the profile score, wherein each profile corresponds to different aging timelines for a plurality of quality-related statuses, wherein each quality-related status corresponds to a different level of confidence as to a cleanliness of an associated telephone number;
associate a quality-related status of the plurality of quality-related statuses with the out of service telephone number based on the assigned profile and timing information relating to a length of time since the out of service telephone number was taken out of service, wherein the associated quality-related status changes according to the respective aging timeline corresponding to the assigned; and
determine timing information relating to eligibility for returning the out of service telephone number into active service, wherein the out of service telephone number is added to an inventory of telephone numbers eligible for active service based on an expiration of a time period corresponding to the timing information.

9. The computer system of claim 8, wherein the criteria comprises one or more of: (i) an average number of daily calls the out of service telephone number was receiving within 90 days of being taken out of service; (ii) a prior use case most closely associated with the out of service telephone number when it was in service; (iii) an area code (NPA) of the out of service telephone number; (iv) a length of time the out of service telephone number was in service prior to being taken out of service; (v) a number of times the out of service telephone number has been taken out of service in the past; and (vi) a reputation of a prior user of the out of service telephone number.

10. The computer system of claim 8, the criteria comprises a local exchange portion (NXX) of the out of service telephone number.

11. The computer system of claim 8, wherein the criteria comprises plurality of historical data parameters, and wherein the return-to-service function assigns a weighted factor to each of the historical data parameters.

12. The computer system of claim 8, wherein the quality-related status corresponds to a rolling average of daily calls intended for the out of service telephone number.

13. The computer system of claim 12, wherein the rolling average of daily calls intended for the out of service telephone number is between a one (1) day and a ten (10) day rolling average inclusive.

14. The computer system of claim 12, the plurality of quality-related statuses comprises a low quality threshold status, a medium quality threshold status, and a high quality threshold status, wherein the rolling average of daily calls intended for the out of service telephone number is highest for the low quality threshold status and lowest for the high quality threshold status.

15. At least one non-transitory machine-readable medium comprising a set of instructions executable on at least one computing device to cause the at least one computing device to manage out of service telephone numbers (TNs) before returning them to active service, the set of instructions to:
identify an out of service telephone number;
obtain a return-to-service function corresponding to the out of service telephone number, wherein the return-to-service function indicates how to calculate a profile score for the out of service telephone number and identifies criteria to use in calculating the profile score;
calculate the profile score for the out of service using the return-to-service function and the criteria;
assign a profile of a plurality of profiles to the out of service telephone number based on the profile score, wherein each profile corresponds to different aging timelines for a plurality of quality-related statuses, wherein each quality-related status corresponds to a different level of confidence as to a cleanliness of an associated telephone number;
associate a quality-related status of the plurality of quality-related statuses with the out of service telephone number based on the assigned profile and timing information relating to a length of time since the out of service telephone number was taken out of service, wherein the associated quality-related status changes according to the respective aging timeline corresponding to the assigned profile; and
determine timing information relating to eligibility for returning the out of service telephone number into active service, wherein the out of service telephone number is added to an inventory of telephone numbers eligible for active service based on an expiration of a time period corresponding to the timing information.

16. The non-transitory machine-readable medium of claim 15, wherein the criteria comprises one or more of: (i) an average number of daily calls the out of service telephone number was receiving within 90 days of being taken out of service; (ii) a prior use case most closely associated with the out of service telephone number when it was in service; (iii) an area code (NPA) of the out of service telephone number; (iv) a length of time the out of service telephone number was in service prior to being taken out of service; (v) a number of times the out of service telephone number has been taken out of service in the past; and (vi) a reputation of a prior user of the out of service telephone number.

17. The non-transitory machine-readable medium of claim 16, wherein the criteria comprises a local exchange portion (NXX) of the out of service telephone number.

18. The non-transitory machine-readable medium of claim 17, wherein the criteria comprises historical data parameters, and wherein the return-to-service function assigns a weighting factor to each of the historical data parameters.

19. The non-transitory machine-readable medium of claim 15, wherein the quality-related status corresponds to a rolling average of daily calls intended for the out of service telephone number.

20. The non-transitory machine-readable medium of claim 19, wherein the rolling average of daily calls intended for the out of service telephone number is between a one (1) day and a ten (10) day rolling average inclusive.

21. The non-transitory machine-readable medium of claim 19, wherein the plurality of quality-related statuses comprises a low quality threshold status, a medium quality threshold status, and a high quality threshold status, wherein the rolling average of daily calls intended for the out of service telephone number is highest for the low quality threshold status and lowest for the high quality threshold status.

* * * * *